United States Patent
Simon

(10) Patent No.: US 7,123,419 B1
(45) Date of Patent: Oct. 17, 2006

(54) COLLIMATING AND OPTICAL ELEMENTS WITH REDUCED MASS

(76) Inventor: Jerome H. Simon, P.O. Box 590204, Newton Centre, MA (US) 02159

( * ) Notice: Subject to any disclaimer, the term of this patent is extended or adjusted under 35 U.S.C. 154(b) by 544 days.

(21) Appl. No.: 10/301,207

(22) Filed: Nov. 21, 2002

Related U.S. Application Data
(60) Provisional application No. 60/332,041, filed on Nov. 21, 2001.

(51) Int. Cl.
G02B 27/00 (2006.01)
G02B 27/10 (2006.01)
F21V 5/00 (2006.01)

(52) U.S. Cl. .......................... 359/641; 359/619; 359/620; 362/330; 362/331; 362/332; 362/334

(58) Field of Classification Search ................. 359/234, 359/235, 618–624, 664, 710, 738, 809, 813, 359/821; 362/290–292, 317, 309, 330–335, 362/346
See application file for complete search history.

(56) References Cited

U.S. PATENT DOCUMENTS

| | | | |
|---|---|---|---|
| 1,900,436 A | 4/1929 | Dourgnon | |
| 2,359,151 A | 6/1941 | Pennow | |
| 2,344,221 A | 3/1942 | Trautner | |
| 2,454,332 A | 2/1944 | Mitchell et al. | |
| 3,739,169 A | 6/1973 | Weinreich | |
| 4,159,511 A | 6/1979 | Dejonc | |
| 4,264,948 A | 4/1981 | Cherouge | |
| 4,962,450 A | 10/1990 | Reshetin | |
| 4,969,074 A | 11/1990 | Davis et al. | |
| 5,897,201 A | 4/1999 | Simon | |
| 5,915,823 A | 6/1999 | Simon | |
| 6,027,231 A | 2/2000 | Fouke | |
| 6,354,725 B1 | 3/2002 | Simon | |
| 6,361,191 B1 | 3/2002 | Simon | |
| 6,502,964 B1 | 1/2003 | Simon | |
| 6,536,921 B1 | 3/2003 | Simon | |
| 6,540,382 B1 | 4/2003 | Simon | |
| 6,616,305 B1 | 9/2003 | Simon | |
| 6,783,261 B1 * | 8/2004 | Simon | ........................ 362/299 |

* cited by examiner

Primary Examiner—Hung Xuan Dang
Assistant Examiner—Joseph Martinez
(74) Attorney, Agent, or Firm—Perkins Smith & Cohen; Harvey Kaye; Jerry Cohen

(57) ABSTRACT

A lens for substantially collimating light in one axis and spreading light in an axis substantially perpendicular to the collimation axis including a lens an entry face which is positive and cylindrical, having a cross-section which includes the positive cylindrical curvature and having tapered sides substantially parallel to the refracted rays produced by the cylinders curvature and a circular convex or a spheric exit face perpendicular to the cylindrical curvature.

8 Claims, 9 Drawing Sheets

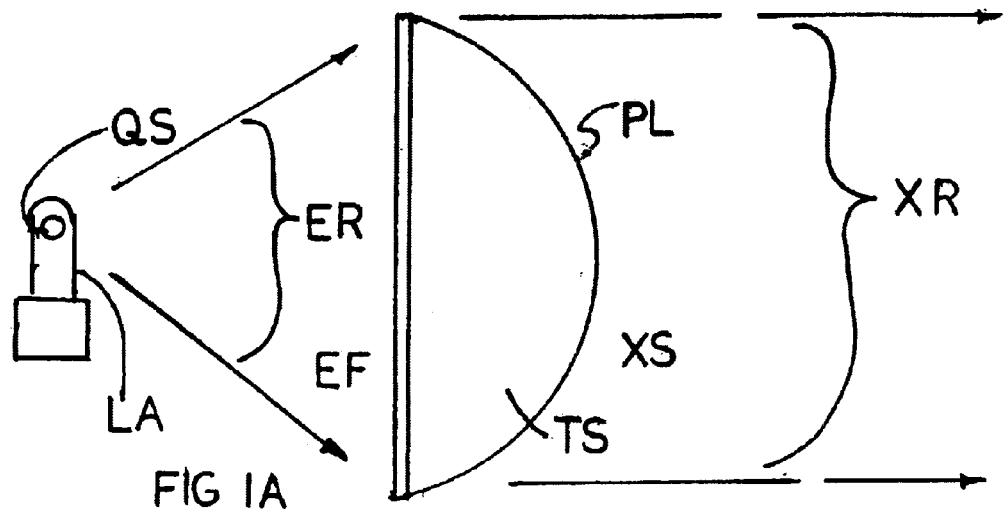
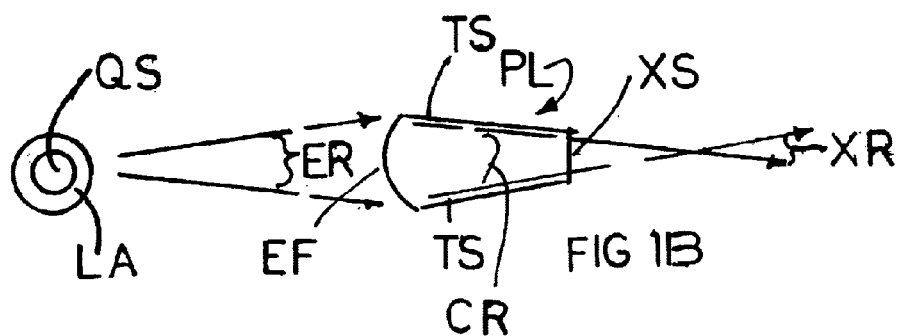
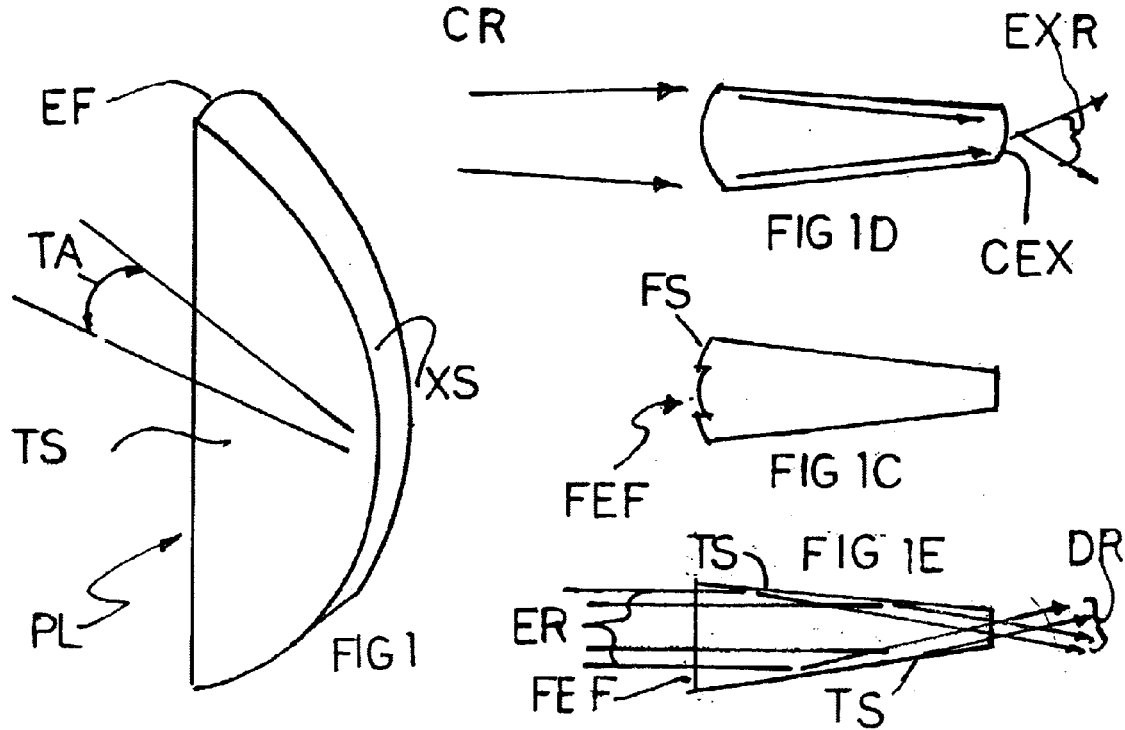

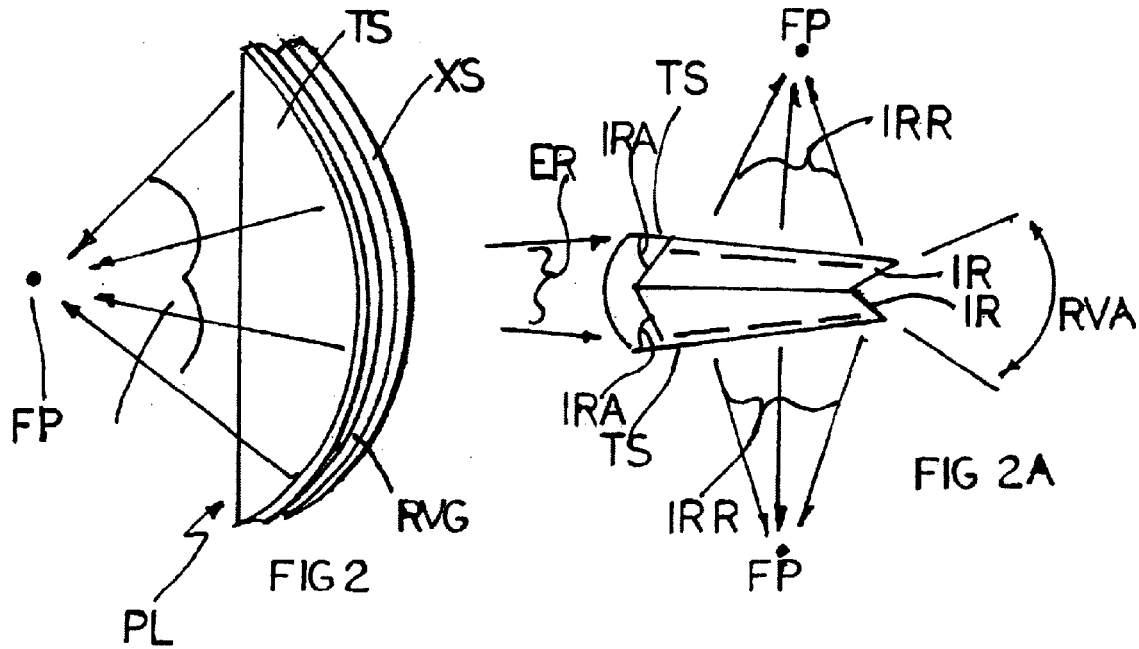
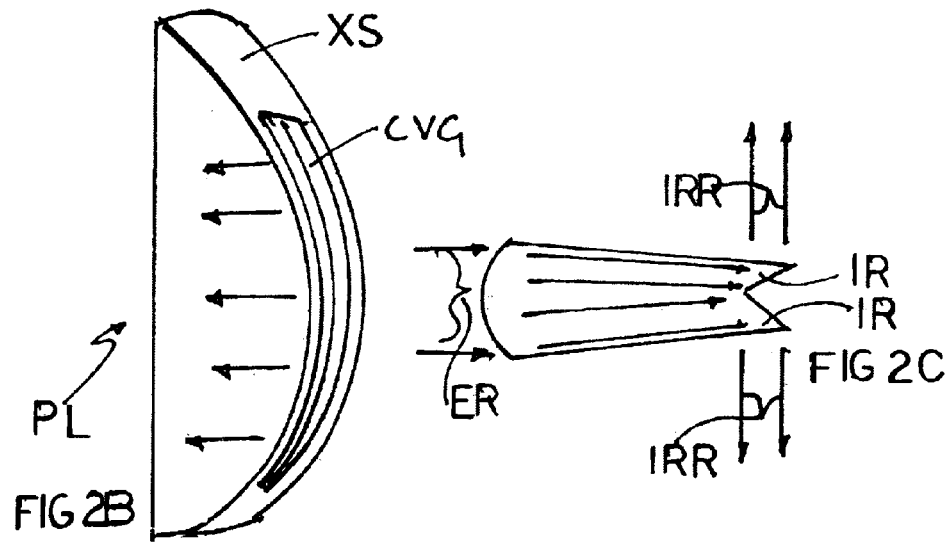

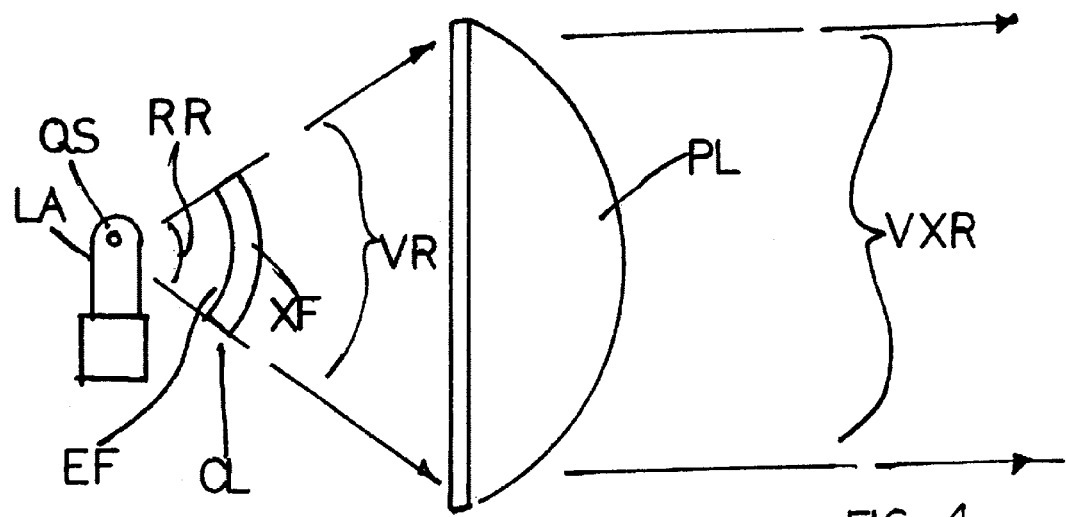
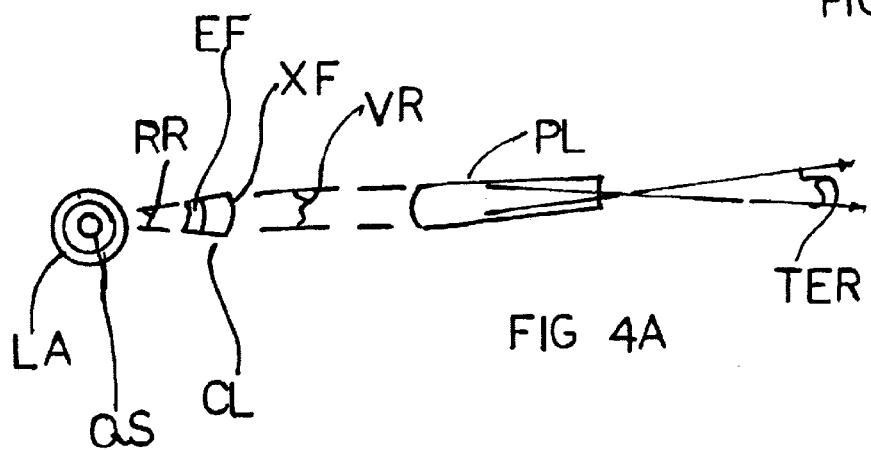
FIG 4
FIG 4A

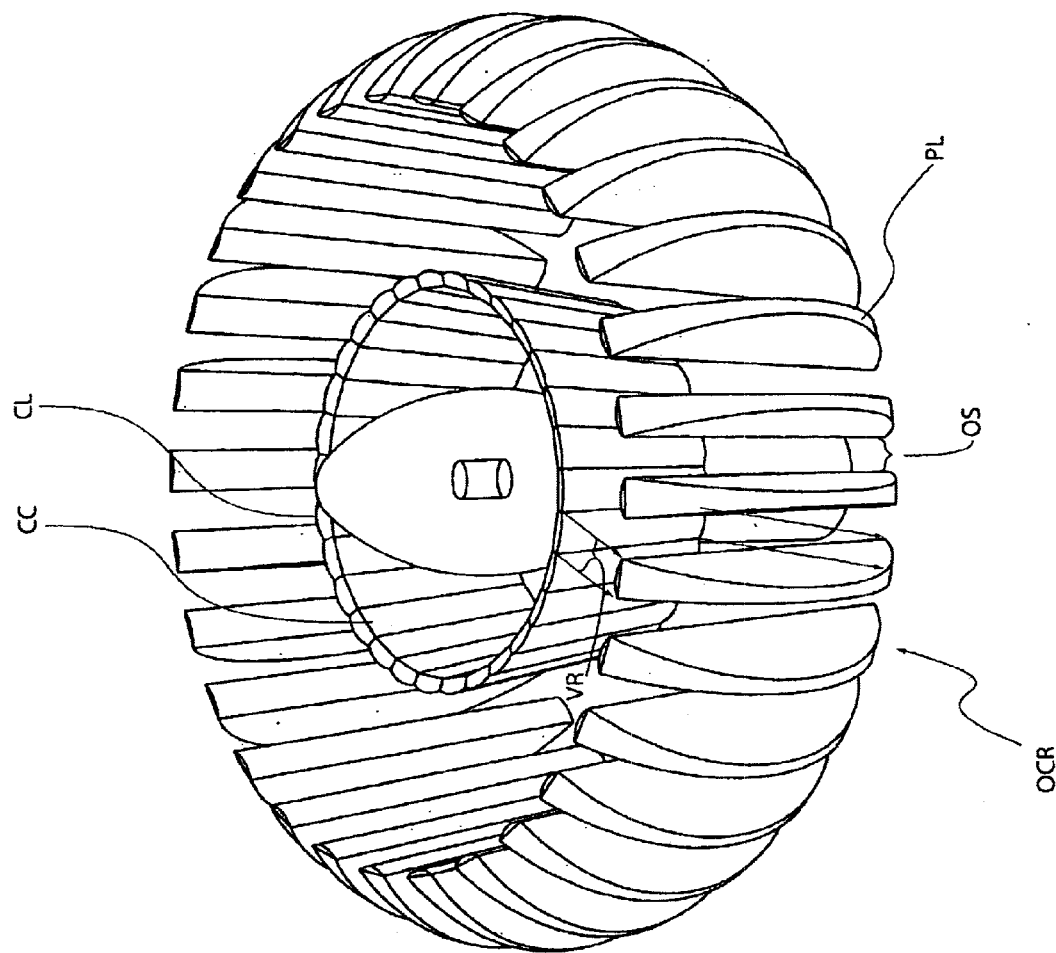

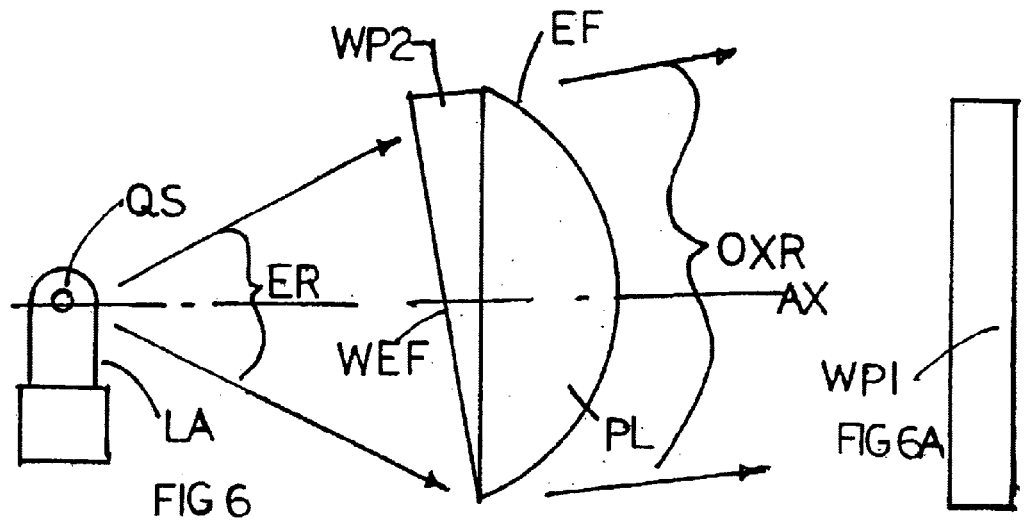
FIG 6
FIG 6A
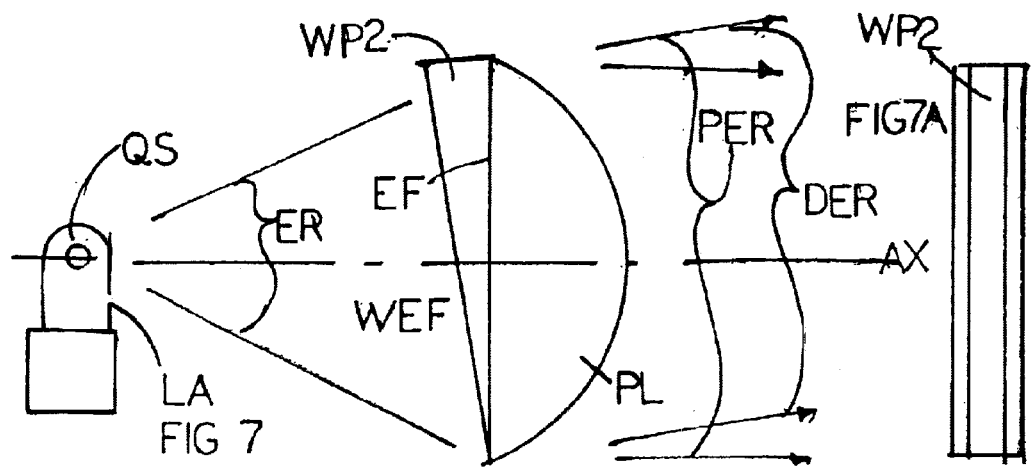
FIG 7
FIG 7A
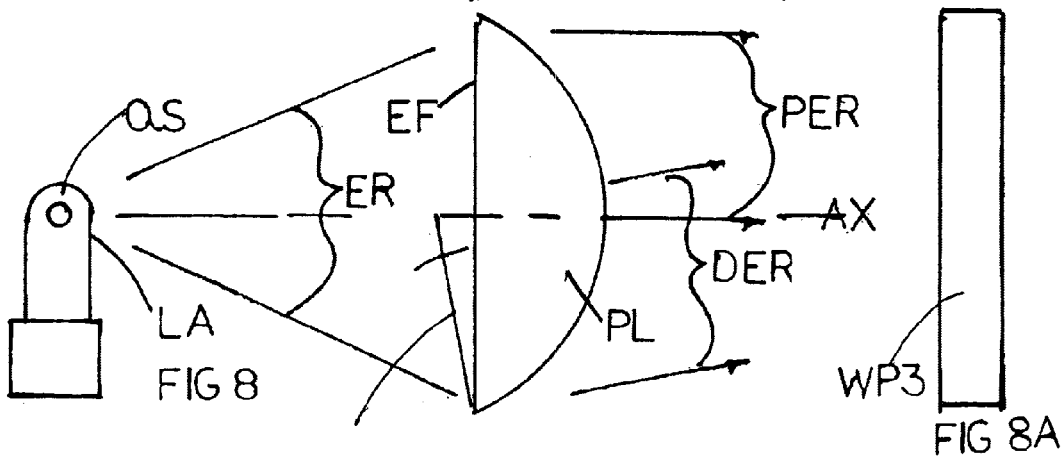
FIG 8
FIG 8A

US 7,123,419 B1

COLLIMATING AND OPTICAL ELEMENTS WITH REDUCED MASS

REFERENCE TO RELATED APPLICATIONS

The present application is based on and claims the priority of provisional application Ser. No. 60/332,041 filed Nov. 21, 2001. The substance of that application is hereby incorporated herein by reference.

SUMMARY OF THE INVENTION

The purpose of this invention is to create a lens with a significant ratio between a quasi-point light source and the collection area of the lens so as to provide a high degree of collimation.

Another purpose of this invention is to create a lens (as stated above) with reduced mass so that it could be manufactured (molded) without distortions and at a low material cost.

Another purpose of this invention is to create a lens (as described above) that, due to controlled light dispersion, reduces the visual brightness of the projected light.

Another purpose of this invention is to create a lens (as described above) that can be used in a variety of indoor and outdoor luminaires.

Other objects, features and advantages will be apparent from the following detailed description of preferred embodiments taken in conjunction with the accompanying drawings in which:

BRIEF DESCRIPTION OF DRAWINGS

FIG. 1 is a three-dimensional view of a wedge shaped lens having a cylindrical entry shape and a spherical or a spherical exit face.

FIG. 1A is a side view of the lens in FIG. 1 illustrating its relationship to a light source.

FIG. 1B is a top view of the lens in FIG. 1 illustrating its relationship to a light source.

FIG. 1C is a top view of the lens shown in FIG. 1 having a variation in its entry face.

FIG. 1D is a top view of the lens shown in FIG. 1 having a variation in its exit face.

FIG. 1E is a top view of the lens shown in FIG. 1 having a variation in its exit face.

FIG. 2 is a three-dimensional view of the lens shown in FIG. 1 with a variation in its exit face.

FIG. 2A is a top view of FIG. 2.

FIG. 2B is a three-dimensional view of FIG. 1 with another variation in the exit face, of FIG. 4.

FIG. 2C is a top view of FIG. 2B.

FIG. 4 is a side view of an optical system illustrated in FIG. 1A with the addition of a second lens.

FIG. 4A is a top view

FIG. 5A is a three-dimensional view of FIG. 5.

FIGS. 6 through 8A illustrate an optical system similar to that in FIG. 1A with the addition of wedge prisms to the entry face of the lens.

DETAILED DESCRIPTION OF PREFERRED EMBODIMENTS

FIG. 1 is a three-dimensional view of a wedged-shaped lens PL having a cylindrical entry face EF and a convex spherical or a spherical exit surface XS. In FIGS. 1, 1A, 1B and 1C, exit surface XS is spherical in the side view and flat in the top view. Sides TS are tapered from surface EF towards XS at acute angle TA.

FIG. 1A is a side view of the lens PL in FIG. 1 illustrating its function with quasi point source QS within lamp LA. Light rays ER are intercepted by and enter entry face EF, pass through PL, and are refracted by XS as substantially collimated rays XR.

FIG. 1B is a top view of the lens PL in FIG. 1 illustrating the function of cylindrical surface EF which gathers and refracts rays ER (radiating from QS) as converging rays CR, that in turn exit through XS as rays XR.

FIG. 1C is a top view of the lens PL in FIG. 1 having cylindrical Fresnel face FEF as a substitute surface and with a similar function to that of EF in FIG. 1B.

FIG. 1D is a top view of the lens PL in FIG. 1 having a convex surface CEX as a substitute to the flat exit face XS of FIGS. 1B and 1C which increases the angles of convergence then divergence of exit rays EXR.

FIG. 1E is a top view of the lens PL in FIG. 1 having a flat entry face FEF allowing entry rays ER to internally reflect off reflective tapered surface TS and exit as divergent rays DR.

FIG. 2 is a three-dimensional view of a lens that is a variation of the lens illustrated in FIG. 1 in that the exit face XS has a V-shaped groove RVG, the bottom of which is substantially concentric with the surface of XS.

FIG. 2A is a top view of lens PL of FIG. 2 and further illustrates the optical function of RVG. The faces of RVG, IR, are polished and reflect ER via total internal reflection (TIR) through tapered lens sides TS in a continuous pattern of exit rays IRR that converge to focal point FP (shown in FIGS. 2 and 2A). The internal angle RVA of RVG ranges from 60° to 120°. The internal angle IRA at the junction of IR and TS, being optimal for TIR to function, is substantially 90°.

FIG. 2B is a three-dimensional view of a lens with the variation of the V groove CVG of RVG in FIG. 2. The apex of CVG is substantially a chord to surface XS.

FIG. 2C illustrates the function of internally reflecting ER off surfaces IR as exit rays IRR.

Figure 3:
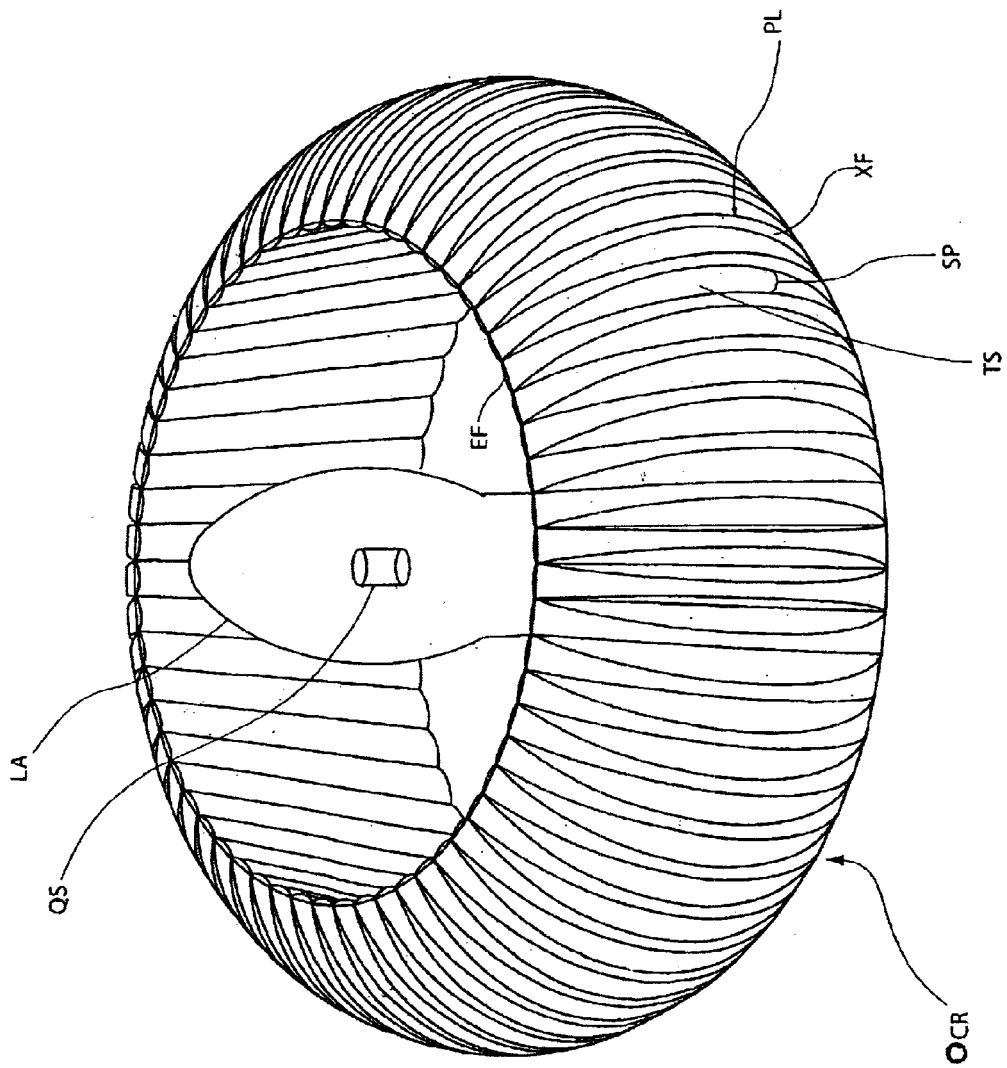
FIG. 3 is a three-dimensional view of a ring lens comprised of lens segments as shown in FIG. 1.

FIG. 3 is a three dimensional view of a composite lens ring OCR surrounding LA, comprised of radially placed wedge lens segments as described in FIGS. 1, 1A, 1B, 1C, 1D, 1E, 2, 2A, 2B, and 2C. The tapered faces TS divide the segments, forming wedge shaped spaces SP between the lenses PL. These spaces reduce the mass of the ring CR.

Figure 3A:
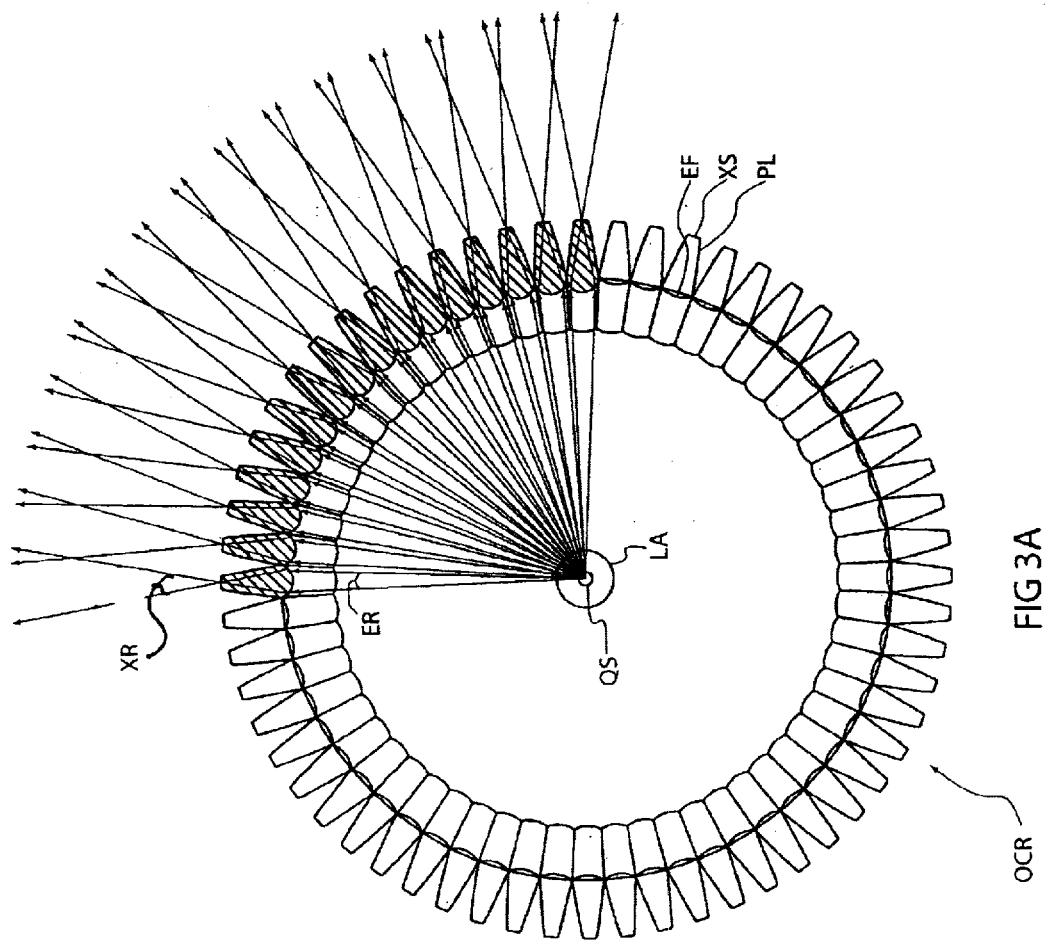
FIG. 3A is a plan view of FIG. 3 with optical functions illustrated.

FIG. 3A is a plan view with a 90° section of FIG. 3 illustrating the optical function of OCR. Rays ER emanating from QS of LA are refracted by EF and XS of PL as divergent rays XR which overlap as a concentric pattern about QS.

FIG. 4 is a side view of an optical system illustrating an optical system similar to that illustrated in FIG. 1A, with the addition of cylindrical lens CL. CL is shown as having a spherical section, although a cylindrical lens having a straight (or other) section may be used. Light rays RR radiating from QS of LA pass through CL as rays VR and are refracted by lens PL (in the ways illustrated and described in FIGS. 1A through 2C), resulting in rays VXR.

In FIG. 4 CL has no power in the side dimension, allowing the divergence of rays RR through LC as VR to be unchanged. It is, however, possible to add power (either negative or positive) to the side dimension of CL by flattening or increasing the curvature of either entry face EF or exit face EX. If, for instance, EF is flattened, CL will gain a positive power which will decrease the divergence of VR, allowing for a decrease of power and vertical height of PL.

FIG. 4A is a top view of the optical system described in FIG. 4. CL is cylindrical in section, having a flat entry face EF and a convex exit face XF. EF could be positive or XF could be flat, or both EF and XF could be positive. Rays VR emanating from QS within LA are refracted and collimated (in a radial plane) as rays VR and are refracted by PL as described in FIGS. 1B, 1C, 1D, 1E, 2A, and 2C.

Figure 5:
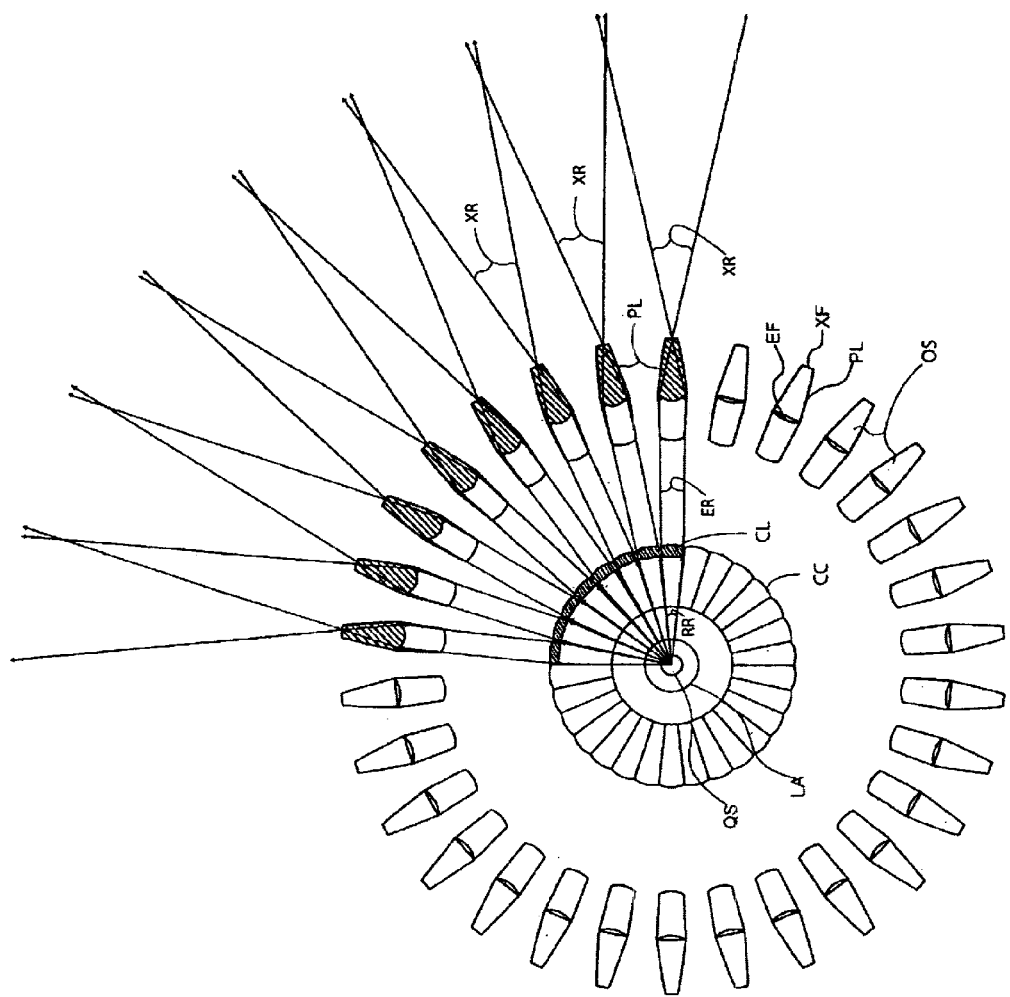
FIG. 5 is a plan view of a composite ring of lens assembly described in FIGS. 4 and 4A.

FIG. 5 is a plan view of a composite ring of the lens assembly described in FIGS. 4 and 4A. Quasi point source QS within lens LA is concentrically surrounded by composite conical ring CC, comprised of cylindrical segments CL, which focus rays RR as substantially parallel rays ER and to be further refracted by PL as divergence rays XR. Rays refracted by each PL overlap in substantially concentric patterns around QS. No light is projected through. The addition of CC provides for the elimination of a refractor (such as PL) in space OS, thus reducing the mass of lens ring OCR in FIG. 3A.

FIG. 6 illustrates an optical system similar to that in FIG. 1A with the addition of a wedge prism section WP1 covering substantially the entire entry face of PL as illustrated in FIG. 6A. Light rays ER emanating from QS of LA are refracted at an angle through WP1 into PL, resulting in rays OXR and exiting at an angle to the central axis AX of the lens lamp relationship.

FIG. 7 is similar to FIG. 6, differing in that WP2 occupies a vertical section of the entry face of PL (shown in FIG. 7A), allowing for a portion of entry rays ER to pass directly through PL and exit as PER that are parallel to axis AX; and a portion of rays ER to exit PL as rays OER that are angular to axis AX.

FIG. 8 is similar to FIG. 7, differing in that WP3 occupies a horizontal area of the entry face of PL (shown in FIG. 8A) allowing for rays ER to be divided horizontally into PER that are parallel to axis AX and OER that are at an angle to axis AX. Wedge prism entry faces WEF of WP1, WP2, and WP3 may be flat or cylindrical and may differ from the surface curvature EF of PL.

In ring configurations illustrated in FIGS. 3, 3A, 5, and 5A, PL segments may be wedge segments of graduated thickness and or cylindrical power, changing the angle of projected light from each PL segment so as to produce a pattern on the surface onto which light is projected. Also, PL segments within a composite ring may be tipped in relationship to each other by rotating the central axis of the lens axially about the light source, resulting in a change in beam direction and altering the beam pattern of the composite ring.

Figure 9:
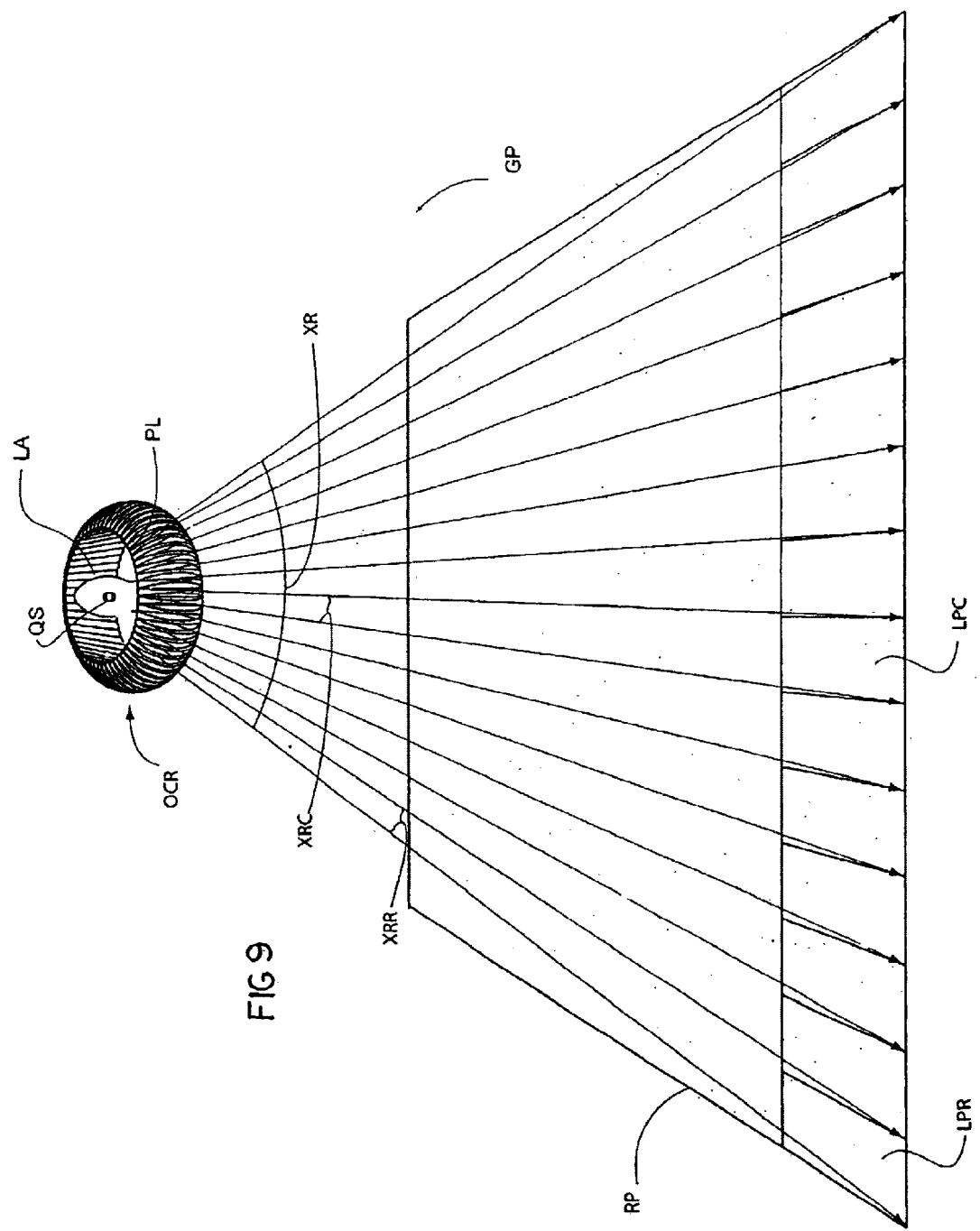
FIG. 9 is a schematic isometric view showing the principle of forming various types of ground patterns.

FIG. 9 illustrates the principle of forming various types of ground patterns utilizing the principles as described in the paragraph above. Light generated from QS of LA is projected through the PC segments of OCR. In this Figure a 90 degree arc segment of OCR is projecting rays XR forming the side of an illuminated rectangular plane RP onto ground plane GP. Since OCR is substantially parallel with GP each PL of OCR requires a modification in pitch, wedge prism configuration and cylindrical entry face (as described in the above paragraph and other figures in the above text (FIGS. 6–8)) in order to refract rays XR at differing graduated angles and brightness to form RP. Rays SRC must be projected at a steeper angle towards illuminated area LPC than rays XRR that illuminate convex corner zone LPR. In the same way other arc segments of OCR illuminate RP forming the described rectangle RP.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A lens for substantially collimating light in one axis and spreading light in an axis substantially perpendicular to the collimation axis comprising a lens, an entry face which is positive and cylindrical, having a cross-section which includes the positive cylindrical curvature and having tapered sides substantially parallel to the refracted rays produced by the cylinders curvature and a circular convex or a spheric exit face perpendicular to the cylindrical curvature.

2. A lens as in claim 1 having an entry face which is essentially flat and tapered sides reflecting light by total internal reflection.

3. A lens as in claim 1 having an entry face with a linear positive fresnel surface.

4. A lens as in claim 1 having an exit face which has a convex surface on the same axis of curvature of the entry face.

5. A ring lens comprising a plurality of lens segments, each as described in claim 1 for radially distributing collimated light.

6. A ring lens as in claim 5 having an inner ring of cylindrical lenses for collimating beams along radial axis's of the ring and an outer lens ring comprised of lens segments as described in claim 1 to receive light from the inner ring.

7. A ring lens as in claim 5, having an entry face having wedge segments for partially covering said entry face, wherein wedge segments have varying degrees of power.

8. A lens as in claim 1 having an entry face having wedge segments for partially covering said entry face.

* * * * *